MEMORY CIRCUITS EMPLOYING NEGATIVE RESISTANCE ELEMENTS

Filed Sept. 30, 1959 3 Sheets-Sheet 1

INVENTORS
JAMES C. MILLER &
LUBOMYR S. ONYSHKEVYCH
BY John V. Regan
ATTORNEY

INVENTORS
JAMES C. MILLER &
LUBOMYR S. ONYSHKEVYCH
BY John V. Regan
ATTORNEY

Dec. 22, 1964 J. C. MILLER ETAL 3,162,842

MEMORY CIRCUITS EMPLOYING NEGATIVE RESISTANCE ELEMENTS

Filed Sept. 30, 1959

3 Sheets-Sheet 3

INVENTORS
JAMES C. MILLER &
LUBOMYR S. ONYSHKEVYCH
BY John V. Regan
ATTORNEY

United States Patent Office 3,162,842

Patented Dec. 22, 1964

3,162,842

MEMORY CIRCUITS EMPLOYING NEGATIVE RESISTANCE ELEMENTS

James C. Miller, Hamilton Square, N.J., and Lubomyr S. Onyshkevych, Cambridge, Mass., assignors to Radio Corporation of America, a corporation of Delaware Filed Sept. 30, 1959, Ser. No. 843,563

8 Claims. (Cl. 340—173)

The present invention relates to improved circuits employing "negative resistance" diodes. While not restricted thereto, the invention is especially useful in the electrical transmission and handling of information.

According to the present invention, signals at frequencies $f_1$ and $f_2$ are applied to a negative resistance diode and a beat frequency signal such as one at a frequency $f_1-f_2$ is derived from the diode.

The invention may be embodied in a memory circuit wherein use is made of the fact that a negative resistance diode is more non-linear in one region of its operating range than in another. Radio-frequency read signals applied to the diode drive the diode along its less non-linear region when in one stable state and along its more non-linear region when in its other stable state. A circuit connected to the diode senses when the diode is driven into its more non-linear region, thereby indicating the stable state of the diode.

In a preferred form of the invention, the read signals consist of simultaneously applied radio-frequency pulses, one at a frequency $f_1$ and the other at a frequency $f_2$. The diode produces a beat frequency signal in response to the two applied pulses when in either of its stable states but, when it is in the region of greater non-linearity, the beat signal produced is correspondingly of greater amplitude. A circuit connected to the diode senses this greater amplitude signal.

Figure 1:
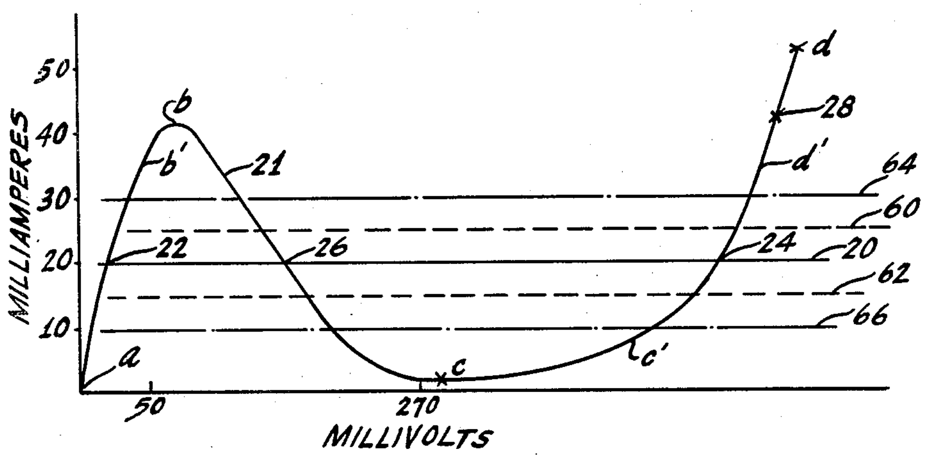
Figure 1A:
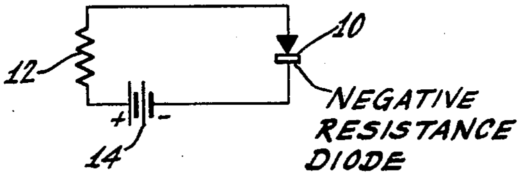
Figure 7:
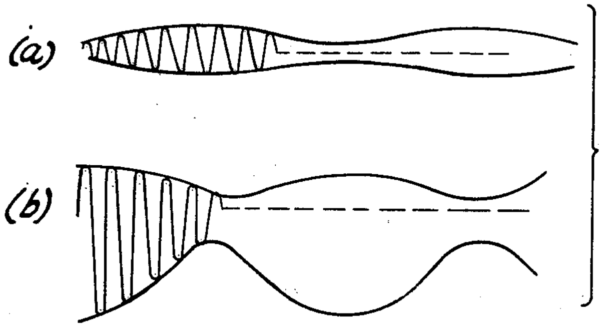
Figure 2:
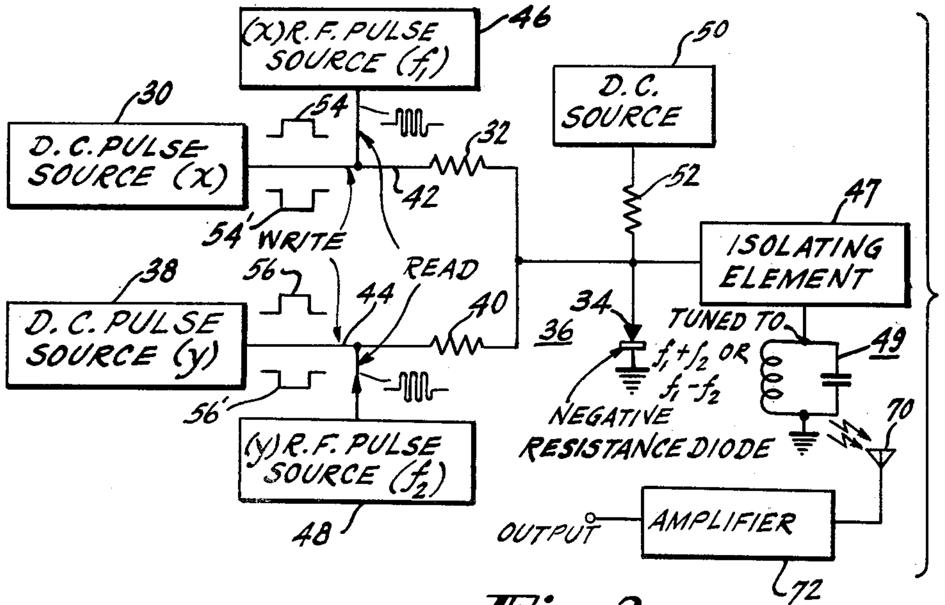
Figure 3:
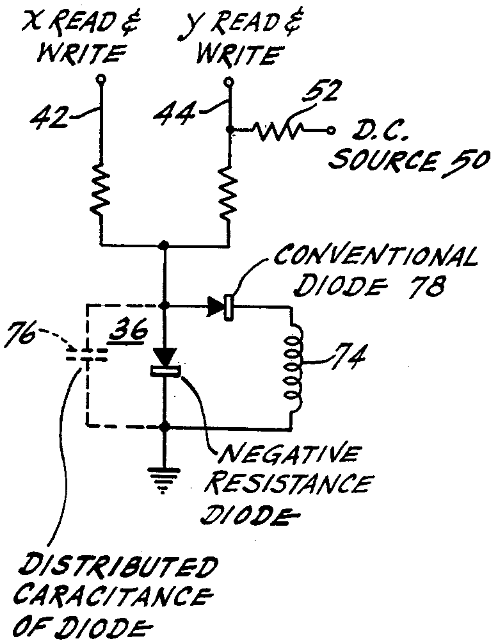
Figure 4:
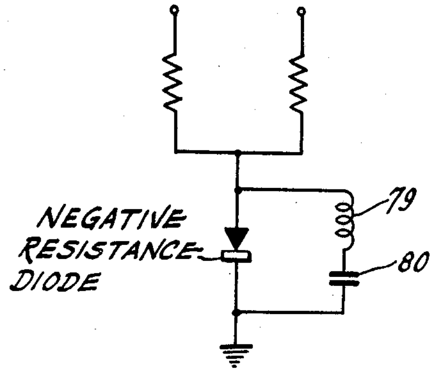
Figures 5, 6:
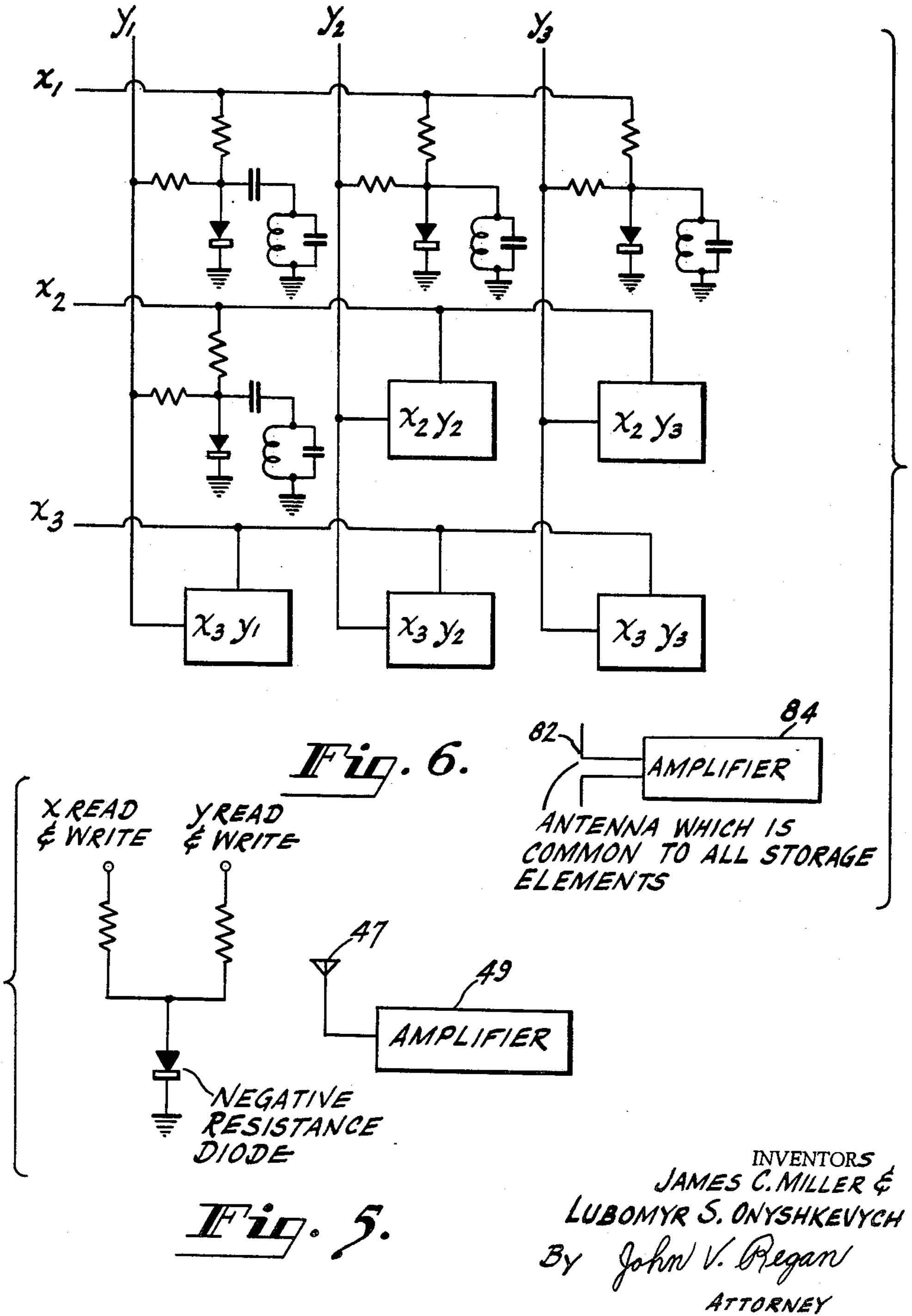

The invention will be described in greater detail by reference to the following description taken in connection with the accompanying drawing in which:

FIG. 1 is a curve useful in explaining the operation of the circuits of the present invention;

FIG. 1*a* is a simplified circuit from which the curve of FIG. 1 may be derived;

FIG. 2 is a block and circuit diagram of one form of the present invention;

FIGS. 3, 4, and 5 are schematic circuit diagrams of modified portions of the circuit of FIG. 2;

FIG. 6 is a block and schematic circuit diagram of a portion of a memory plane according to the present invention; and FIG. 7 is a drawing of waveforms to explain the operation of the circuit of the invention.

A volt-ampere characteristic 21 of a typical negative resistance diode of the voltage controlled type, now known as a tunnel diode, is shown in FIG. 1. The values of millivolts and milliamperes given are typical but are not meant to be limiting. The milliampere range, for example, may differ substantially for different diodes.

The portions *ab* and *cd* of the volt-ampere characteristic are regions of positive resistance ($dE/dI$, the inverse of the slope, which is equal to resistance R, is a positive quantity). The portion *bc* of the volt-ampere characteristic is a region of negative resistance.

A circuit for the diode may include, in series, a diode 10, a load resistor 12 having a value of at least ten times or so the diode resistance, and a source of voltage 14 having a value of 3 volts or so. The diode resistance may be of the order of a few ohms or more and the load resistance up to several hundred ohms. The source and load resistor together act like a constant current source, and the idealized load line 20 is therefore parallel to the millivolt axis. In practice, the source is not a perfect constant current source and load line 20 is at a slight angle with respect to the millvolt axis.

Load line 20 intersects the positive resistance section *ab* of the diode characteristic at 22 and the positive resistance region *cd* of the characteristic 21 at 24. In practice, the current at point 22 is slightly larger than the current at 24 for the reason given above. The load line 20 also intersects the negative resistance region *bc* of the diode characteristic 21 at 26.

Assume that initially the voltage across the diode is of the order of 25 millivolts or so. The current through the diode is about 20 milliamperes and the diode is at a stable low voltage state represented by the point 22. If the forward bias current through the diode is increased, the load line is raised or shifted on the characteristic until the load line passes through point *b*. The point *b* represents a current of about 43 milliamperes. Increasing the current to a value greater than this tends to drive the diode into its negative resistance region *bc*. However, the negative resistance region represents an unstable condition of the diode and the diode very rapidly switches to its stable state on the positive resistance portion *cd* of the characteristic. If the total current through the diode remains at slightly more than 43 milliamperes, the voltage across the diode assumes a value represented by the point 28 on the characteristic or roughly 400 millivolts. If the current through the diode returns to the value indicated by the intersection of the load line 20 and the characteristic 21, the voltage reduces to a lower value as indicated by point 24. The point 24 or some other stable point of intersection of a load line and a diode characteristic on the higher voltage positive slope region such as *cd* of the characteristic is hereafter termed the high voltage state of the diode and the point 22 or some other stable point of intersection of a load line and a diode characteristic on the low voltage positive region *ab* of the characteristic is hereafter termed the low voltage state of the diode.

In a practical circuit, the diode may be switched from one stable state to another by current pulses—as short as 0.5–2 millimicroseconds in duration, for example. A forward bias current pulse can switch the diode from its low to its high voltage state and a reverse bias current pulse can switch the diode from its high to its low voltage state.

The two positive resistance portions of the curve have different shapes. Positive resistance portion *ab'* (*b'* is a point on the characteristic 21 at a little lower voltage than the maximum current point *b*) is nearly linear. Positive resistance portion *c'd'* is quite non-linear especially over the lower part thereof (where *c'* is a point on the characteristic 21 at a little higher voltage than the minimum current point *c* and *d'* is a point at about the same current value as *b'*, but corresponding to a current above the minimum current point). As will be explained in detail below, this difference in curve linearity is made use of in the present invention.

A description of negative resistance diodes having a characteristic such as shown in FIG. 1 may be found in an article by H. S. Sommers, Jr. appearing in the Proceedings of the IRE, July 1959, page 1201. These diodes are now commonly referred to as "tunnel" diodes.

FIG. 2 illustrates one form of the present invention. A direct-current (D.C.) pulse source 30 is connected through a resistor 32 to the anode 34 of a negative resistance diode 36. A second direct current (D.C.) pulse source 38 is connected through resistor 40 also to anode 34. (Diodes or capacitors, or other coupling devices, may be substituted for the resistors 32 and 40.) As more fully described hereinafter, lead 42 may carry so-called $x$ information and may therefore be thought of as an $x$ bus, and lead 44 may carry so-called $y$ information and may therefore be thought of as a $y$ bus. This portion of the system is for writing information into the negative resistance diode 36.

A radio-frequency (R.F.) pulse source 46 is connected to $x$ bus 42 and a second radio-frequency (R.F.) pulse source 48 is connected to $y$ bus 44. These sources 46 and 48 supply radio-frequency pulses (bursts of radio-frequency) respectively of different carrier frequencies $f_1$ and $f_2$. Sources 30, 38, 46 and 48 have sufficiently high internal impedances effectively to be isolated from one another so that the radio-frequency output from sources 46 and 48 does not affect the direct-current pulse sources 30 and 38 and vice versa.

Anode 34 is connected through an isolating element 47 to a parallel resonant circuit 49. The isolating element may take the form of a capacitor, diode, high value of resistance or other suitable element. Its purpose is to decouple the diode 36 from the resonant circuit 49 and to prevent or lessen the flow of direct current through the inductor of the resonant circuit.

The quiescent bias current for diode 36 is applied from a direct-current source 50 connected to anode 34 through a resistor 52.

The circuit of FIG. 2 operates as follows. It may be assumed during this discussion that the low voltage stable state of the negative resistance diode represents one binary digit, for example, the binary digit zero, and the high voltage state the binary digit one. With respect to the diode 36, the direct-current source 50 and resistor 52 together act like a constant current source and produce a load line such as shown at 20 in FIG. 1. With the diode in its low voltage state (point 22 on the curve), the diode draws about 20 milliamperes of current. Direct-current pulse source 30 applies a forward bias pulse 54 to the diode and direct-current pulse source 38 applies a forward bias pulse 56 to the diode. These pulses are "seen" by the diode as forward current pulses. The amplitude of the pulses is such that one pulse alone is insufficient to drive load line 20 past point $b$ on the curve but two pulses together are sufficient to do so. Accordingly, when pulses 54 and 56 are applied concurrently, the diode is switched from its low voltage state 22 to high voltage state 24 (FIG. 1). The diode then stores the binary digit one.

The diode can be switched from its high to its low voltage state in an analogous manner. Two reverse-bias, direct-current pulses (indicated as 54′ and 56′) are generated by sources 30 and 38 respectively. These reverse-bias pulses have sufficient amplitude together to drive the load line so that the point representing the diode state follows the curve 21 from point 24 past point $c$. Sources 30 and 38 may be used to produce both the forward and reverse bias pulses or separate sources may be used to produce the reverse-bias pulses.

Non-destructive read-out is accomplished by sources 46 and 48 and associated elements. These sources apply radio-frequency pulses at frequencies $f_1$ and $f_2$, respectively, to the diode. One applied pulse changes the current through the diode between dashed load lines 60 and 62 (FIG. 1). Two concurrently applied radio-frequency pulses periodically swing the current through the diode between dot-dashed load lines 64 and 66.

Assume first that the diode is in its low voltage state 22. It will be seen that the portion of the diode characteristic extending from point 22 to the intersection of the curve portion $ab$ with line 64 is only slightly non-linear as is the portion of the characteristics extending between point 22 and the intersection of dot-dashed line 66 with the curve portion $ab$. Accordingly, the diode generates beat frequencies $f_1-f_2$, $f_1+f_2$ and others of relatively small amplitude. The complex waveform of FIG. 7$a$ appears across the diode when it is in the low state and the concurrent R.F. pulses are applied. The envelope of the waveform of FIG. 7$a$ is of relatively small peak-to-peak amplitude and is at the difference beat frequency $f_1-f_2$. Note that the waveform of FIG. 7$a$ is essentially symmetrical about a datum line.

Assume now that the diode is in its high voltage state as represented by point 24. The region between point 24 and the intersection of line 66 with portion $c'd'$ of the curve is highly non-linear. When the two radio-frequency pulses at frequencies $f_1$ and $f_2$ drive the diode from point 24 between load lines 64 and 66, the diode generates beat frequency pulses of relatively high peak-to-peak amplitude, as illustrated in FIG. 7$b$. The envelope of the waveform of FIG. 7$b$ also is at the difference beat frequency. Note that this waveform is asymmetrical. The upper portion of the envelope, which is of relatively low amplitude, corresponds to excursions in the region between point 24 and load line 64, and the lower portion of the envelope, which is of much greater amplitude, corresponds to the excursions in the more non-linear region between point 24 and load line 66.

Resonant circuit 49 is preferably tuned to the difference beat frequency $f_1-f_2$. Preferably, the beat frequency is not a subharmonic of either frequency $f_1$ or frequency $f_2$. Accordingly, when the negative resistance diode is in its high voltage state and frequencies $f_1$ and $f_2$ are simultaneously applied, the diode generates beat frequency signals at frequency $f_1-f_2$ and resonant circuit 48 is driven into oscillation. On the other hand, when the diode is in its low voltage state, the heat frequency signal is of such low amplitude that little or no oscillations are produced in the tuned circuit.

Information is read out of the resonant circuit 48 either by direct connection to the tuned circuit (not shown) or by means of an antenna 70. The antenna may be located within a few inches or less of resonant circuit 49 or several feet from circuit 49. When very close to the resonant circuit, the coupling to the antenna is mainly inductive and when further from the circuit mainly radiative. For extremely high speed applications, the former is preferred to reduce the time required for the radiated signal to travel from the tuned circuit 48 to the antenna. In these high speed applications even the very short time required for the signal to travel several feet is important. For slower speed applications, the antenna is preferably located further from the resonant circuit 49.

Amplifier 72 connected to antenna 70 serves to amplify the signals the latter receives. For high speed applications, a broad-band amplifier 72 is used. It passes a very narrow, very steep radio-frequency pulse. In such case, the amplifier may be, for example, a traveling wave tube, a parametric amplifier, or a negative resistance diode amplifier. For lower speed computer applications, the amplifier 72 can be a transistorized or other type of less broad-band amplifier.

FIG. 3 illustrates a modified portion of the circuit of FIG. 2. The direct-current source 50 rather than being connected to the negative resistance diode is connected to one of the $x$, $y$ buses. The figure shows the source connected to the $y$ bus 44, but it could instead be connected to the $x$ bus. An advantage of this arrangement is that only a single D.C. source and coupling element 52 common to all diodes is used. The resonant circuit of the modification shown in FIG. 3 utilizes an inductor 74 of relatively small value and the distributed capacitance of the diode itself. This circuit can resonant at a relatively high beat frequency. The isolating element chosen for illustration is a conventional diode 78 with its anode connected to the anode of the negative resistance diode 36. At the low voltages employed, the diode does not act as a short circuit to the direct-current but offers appreciable impedance. This diode 78 could be reversed and the circuit would still operate. As already mentioned, other isolating elements could be used instead.

In the modification of FIG. 4, a series resonant circuit including inductor 79 and capacitor 80 is used instead of the parallel resonant circuit of FIGS. 2 and 3. Either type resonant circuit can be used in either figure. When the series tuned circuit is used, the isolating element 47 may be omitted.

The modification of FIG. 5 employs no resonant circuit, either series or parallel. In this circuit, when the diode is in its low state, the simultaneously applied radio-frequency pulses at frequencies $f_1$ and $f_2$ produce beat signals of low amplitude and when the diode is in its high state, the same radio-frequency pulses produce beat signals of relatively high amplitude. The difference in amplitude may be from about 2:1 to 5:1 depending upon the amplitudes of the read signals and the position of the load line on the diode characteristic. These beat signals, it has been found, radiate from the diode and may be sensed by an antenna. Radiation has been detected up to about 10 to 15 feet or so. The antenna is shown at 47 and the amplifier, which is tuned to the beat frequency $f_1-f_2$, is connected to the antenna at 49.

A memory matrix or memory plane according to the invention is illustrated in FIG. 6. Although only three $x$ buses and three $y$ buses are shown, it will be appreciated that there may be many more of each, and that there may be many more than nine memory elements, and that there may be many memory planes. The $x$ and $y$ read and write sources are only indicated in FIG. 6 for one $x$ and one $y$ bus and may be of the type illustrated in FIG. 2. A selected $x$ bus, $x_1$, may correspond to bus 42 and may be coupled through switches (not shown) to sources 30 and 46, and a selected $y$ bus, $y_1$, may correspond to bus 44 and may be coupled through switches (not shown) to sources 38 and 48. Similar circuits may be provided for other bus lines. Normally, selection switches or gates (not shown) would be employed between the read or write sources and the $x$ and $y$ buses so that information could be written into and read out of desired ones of the memory units.

The antenna 82, shown in FIG. 6, is common to all memory elements in a memory plane. It may be located between 1 and 15 feet or so from the radiating source (tuned circuit in the embodiments shown or diode in the embodiment of FIG. 5). Alternatively, the antenna can be located closer to the radiating source. The antenna illustrated is a dipole which is tuned to the frequency to which the resonant circuits are tuned—preferably the difference beat frequency $f_1-f_2$ or the sum beat frequency $f_1+f_2$. Other commonly employed antennas may be used instead.

In the circuits illustrated, the resonant circuits are formed of lumped reactive elements. It is to be understood that the invention is equally applicable to the use of distributed circuits such as quarter or half wave transmission lines, cavity resonators, or the like. Preferably, when using distributed circuits the memory planes are made of strip transmission line and the resonant circuits are made of strip transmission line, quarter or half wavelength stubs.

The amplifier 84 connected to antenna 82 serves to amplify the signals received by the antenna 82. The amplifier may have the characteristics of amplifier 49 described in connection with FIG. 5. Preferably, the amplifier includes an appropriate filter for improving the signal-to-noise ratio of the amplified signal.

In the embodiments of the invention discussed above, the $f_1$ and $f_2$ read pulses together are only of sufficient amplitude to drive the load line along the positive resistance region of the operating range of the diode. However, the circuit has also been found to be operative using read pulses having a net amplitude which is sufficient to drive the diode from the positive region $cd$ into the negative resistance region $bc$. The waveform observed when the diode is in its high state in this case is similar to the one of FIG. 7$b$ except that the negative peaks appear to reach a maximum negative value beyond which they do not extend.

In the embodiments of the invention discussed, the binary digit one is written into a diode by simultaneously applying two forward bias, direct-current pulses and the binary digit zero is written into the diode by simultaneously applying two reverse bias, direct-current pulses. There is another writing arrangement which may be employed. This one requires a so-called "$z$" axis, that is, an additional bus coupled to all the diode anodes of a memory plane. This $z$ bus is connected through an isolating resistor to a reverse bias, direct-current, inhibit pulse source. In order to write information into a selected diode in a memory plane, forward-bias pulses are applied from the $x$ and $y$ write sources to the $x$ and $y$ buses connected to the selected diode. At the same time, an inhibit pulse of opposite polarity from the $x$ and $y$ write pulses is applied or not applied to the $z$ bus. When the inhibit pulse is applied, the net signal applied to the selected diode is of insufficient amplitude to change the state of the selected diode. If the inhibit pulse is not applied, the $x$ and $y$ pulses together change the selected diode to the state representing the binary one digit.

A system using a "separate $z$" bus for each different memory plane is advantageous in so-called "word organized" systems. In these systems the $x$ and $y$ buses are common to all the planes. Thus, assume a memory system having "$n$" planes for storing binary words each of "$n$" binary digits. The binary digits of any word are located in corresponding positions in all the "$n$" planes. Therefore, by selecting one $x$ bus and one $y$ bus, all the digits of a desired word are selected at the same time. Since some of the word digits are binar y ones and some are binary zeros, the separate "$z$" buses provide the additional control for writing the binary one or binary zero, as desired, in any one of the planes.

The circuit described has a number of advantages. For example, only one negative resistance diode is required for each bit of information. The read-out is non-destructive since it occurs entirely within a positive resistance region of the diode characteristic. There is minimum interference between bits of stored information since storage is in the form of a direct voltage. There is good signal-to-noise ratio read-out. Finally, a single set of connections can serve for both reading and writing.

In the various circuits of the invention, the negative resistance diode is quiescently bistably biased. This implies that the intersections of the current vs. voltage characteristic of the negative resistance diode, with the load line for the diode, define two stable operating points. For example, in the circuit of FIGURE 2, the substantially constant current source 50 supplies a value of current such that the negative resistance diode 34 can operate stably in the low voltage state or the high voltage state. In the showing of FIGURE 1, the load line 20 (shown in somewhat idealized form) has a slope indicative of the relatively large internal impedance of the bias source (50 in FIGURE 2). This load line 20 intersects the low voltage positive resistance operating region $ab$ of the diode at operating point 22 and the high voltage positive resistance operating region $cd$ of the diode at operating point 24. Both operating points are stable, that is, the diode can, in its quiescent condition, remain at operating point 22 (roughly 20 millivolts across the diode) or 24 (roughly 400 millivolts across the diode), since both operating points are in positive resistance regions. Therefore, negative resistance diode 34 can be said to be "quiescently bistably biased."

What is claimed is:

1. In combination, a negative resistance diode having two positive resistance operating regions which are non-linear, and biased to operate in one of said regions; means, including a radio frequency source, for driving the diode solely along the one of its non-linear positive resistance operating regions at which it is biased; and means including a pickup device spaced from the diode, and a signal amplitude detector coupled to said pickup device, for ascertaining the one of its non-linear resistance regions along which the diode is driven.

2. In combination, a negative resistance diode having, in its operating range, a negative resistance region between two positive resistance operating regions, one positive resistance region exhibiting a resistance slope about a first operating point which is substantially more non-linear than the resistance slope about a second operating point exhibited in the other positive resistance region;

means for quiescently bistably biasing the diode at one of said first and second operating points;

means for applying pulse modulated carrier frequency signals at carrier frequencies $f_1$ and $f_2$ to said diode for causing said diode to produce a beat frequency signal which is of relatively larger amplitude when operating at said first operating point than when operating at said second operating point; and a circuit tuned to said beat frequency signal for receiving the same.

3. In combination, a negative resistance diode having, in its operating range, a negative resistance region between two positive resistance operating regions, one positive resistance region exhibiting a resistance slope about a first operating point which is substantially more non-linear than the resistance slope about a second operating point exhibited in the other positive resistance region;

means for quiescently bistably biasing the diode at one of said first and second operating points;

means for applying pulse modulated carrier frequency signals at carrier frequencies $f_1$ and $f_2$ to said diode for causing said diode to produce a beat frequency signal which is of relatively larger amplitude when operating at said first operating point than when operating at said second operating point; and means for receiving radiation at said beat frequency.

4. In combination, a negative resistance diode having, in its operating range, a negative resistance region between two positive resistance operating regions, one positive resistance region exhibiting a resistance slope about a first operating point which is substantially more non-linear than the resistance slope about a second operating point exhibited in the other positive resistance region;

means for quiescently bistably biasing the diode at one of said first and second operating points;

means for applying pulse modulated carrier frequency signals at carrier frequencies $f_1$ and $f_2$ to said diode for causing said diode to produce a beat frequency signal which is of relatively larger amplitude when operating at said first operating point than when operating at said second operating point; and a resonant circuit connected across said diode and tuned to the beat frequency $f_1—f_2$.

5. A memory plane comprising, in combination, a plurality of negative resistance diodes, each having, in its operating range, a negative resistance region between two positive resistance operating regions, one positive resistance region exhibiting a resistance slope about the first operating point which is substantially more non-linear than the resistance slope about a second operating point exhibited in the other positive resistance region;

means for quiescently bistably biasing all diodes at one of said first and second operating points;

a plurality of $x$ leads;

a like plurality of $y$ leads, each diode being connected to one $x$ lead and one $y$ lead, and all diodes being connected to a different pair of said leads;

a circuit for reading information out of the diodes including means for concurrently applying a pulse modulated carrier frequency signal at carrier frequency $f_1$ to one of the $x$ leads and a pulse modulated carrier frequency at carrier frequency $f_2$ to one of the $y$ leads for causing the diode connected to said one $x$ and said one $y$ lead to produce a beat frequency signal which is of larger amplitude when the diode is at its first operating point than when it is at its second operating point; and a circuit including a pick-up means which is common to all diodes for receiving energy at said beat frequency.

6. In combination, a negative resistance element having two regions in its operating range exhibiting a positive resistance, one positive resistance operating region having a resistance about a first operating point which is substantially more non-linear than that about a second operating point in the other positive resistance region, and a region between these positive resistance regions exhibiting a negative resistance;

means for bistably biasing said element at a level at which it can assume one of said first and second operating points;

means for switching said element to either one of its first and second operating points;

means for applying pulse modulated carrier frequency signals at carrier frequencies $f_1$ and $f_2$ to said element; and means for sensing the amplitude of the beat frequency signal thus produced.

7. In a memory, a tunnel diode having one operating point in the low voltage state, and a second operating point in the high voltage state about which the resistance slope exhibited is substantially more non-linear than the resistance slope exhibited about the first operating point;

means for quiescently bistably biasing the diode to one of said first and second operating points; and means for ascertaining the state of the diode comprising means for applying pulse modulated carrier frequency signals at carrier frequencies $f_1$ and $f_2$ to the diode, and means for sensing the amplitude of a beat frequency which results.

8. A memory plane comprising, in combination, a plurality of tunnel diodes, each tunnel diode having one operating point in the low voltage state, and a second operating point in the high voltage state about which the resistance slope exhibited is substantially more non-linear than the resistance slope exhibited about the first operating point;

means for quiescently bistably biasing all of said diodes to one of said first and second operating points;

a plurality of $x$ leads;

a like plurality of $y$ leads, each diode being connected to one $x$ lead and one $y$ lead, and all diodes being connected to different pairs of said leads;

means for reading information into said diodes comprising means coupled to said $x$ and $y$ leads for selectively switching the diodes to said first and second operating points; and means for ascertaining the state of a selected diode comprising means for applying pulse modulated carrier frequency signals at carrier frequency $f_1$ to one of the $x$ leads and at carrier frequency $f_2$ to one of the $y$ leads, and means for sensing the amplitude of the beat frequency which results.

References Cited in the file of this patent

UNITED STATES PATENTS

| | | |
|---|---|---|
| 2,692,947 | Spencer | Oct. 26, 1954 |
| 2,815,488 | Von Neumann | Dec. 3, 1957 |
| 2,845,611 | Williams | July 29, 1958 |
| 2,958,074 | Kilburn | Oct. 25, 1960 |
| 2,975,377 | Price et al. | Mar. 14, 1961 |
| 2,986,724 | Jaeger | May 30, 1961 |

OTHER REFERENCES

Article by Gabel, Wireless World And Radio Review, Oct. 8, 1924, pp. 47–50.

Article by Lossev, Wireless World And Radio Review, Oct. 22, 1924, pp. 93–96.

Article by Esaki, Physic Review, vol. 109, No. 2, pp. 603–604, Jan. 15, 1958.